United States Patent
Ericsson et al.

(10) Patent No.: US 7,263,948 B2
(45) Date of Patent: Sep. 4, 2007

(54) METHOD AND AN ARRANGEMENT AT A DAIRY FARM

(75) Inventors: Jan Ericsson, Uttran (SE); Lars Wase, Danderyd (SE); Nils Erik Holmertz, Huddinge (SE); Epke Bosma, Tumba (SE)

(73) Assignee: Delaval Holding AB, Tumba (SE)

( * ) Notice: Subject to any disclaimer, the term of this patent is extended or adjusted under 35 U.S.C. 154(b) by 184 days.

(21) Appl. No.: 10/506,810

(22) PCT Filed: Mar. 12, 2003

(86) PCT No.: PCT/SE03/00417

§ 371 (c)(1),
(2), (4) Date: Sep. 7, 2004

(87) PCT Pub. No.: WO03/077645

PCT Pub. Date: Sep. 25, 2003

(65) Prior Publication Data

US 2005/0126499 A1    Jun. 16, 2005

(30) Foreign Application Priority Data

Mar. 15, 2002  (SE) .................................. 0200802
Oct. 10, 2002  (SE) .................................. 0202988

(51) Int. Cl.
*A01J 7/02* (2006.01)
(52) U.S. Cl. .................................................. 119/14.18
(58) Field of Classification Search ............. 119/14.01, 119/14.02, 14.08, 14.14, 14.18
See application file for complete search history.

(56) References Cited

U.S. PATENT DOCUMENTS

| 2,228,520 A | 1/1941 | Hodsdon |
| 3,688,783 A | 9/1972 | Owens |

(Continued)

FOREIGN PATENT DOCUMENTS

CH    368009    4/1963

(Continued)

OTHER PUBLICATIONS

538/1MB Research Disclosure, Apr. 2001, p. 538 Nr. 444037 & 111037.

*Primary Examiner*—Yvonne R. Abbott
(74) *Attorney, Agent, or Firm*—Harness, Dickey & Pierce, P.L.C.

(57) ABSTRACT

The present invention refers to a cleaning method in a milking system (9) comprising a plurality of teat cups (19), each of which is connected to a respective milk line, wherein, during milking of the teats of a milking animal, the plurality of teat cups (19) are attached to the teats of the animal, and vacuum is supplied to the respective milk lines in order to draw milk from the teats of the milking animal. The cleaning comprises the steps of removing milk or other residues present at each of said plurality of teat cups by means of flushing (37) each of said plurality of teat cups with a cleaning fluid supplied via a supply line (36, 34*c*); evacuating cleaning fluid from each of said plurality of teat cups or from the supply line; and disinfecting at least one of said plurality of teat cups by means of exposing (60) said at lest one of said plurality of teat cups to steam.

30 Claims, 6 Drawing Sheets

U.S. PATENT DOCUMENTS

| | | | |
|---|---|---|---|
| 4,222,346 A * | 9/1980 | Reisgies | 119/14.18 |
| 4,572,943 A | 2/1986 | Högfeldt | |
| 5,651,329 A * | 7/1997 | van den Berg et al. | 119/14.02 |
| 5,881,669 A * | 3/1999 | van den Berg et al. | 119/14.03 |
| 6,079,359 A * | 6/2000 | van den Berg | 119/14.01 |
| 7,036,981 B2 * | 5/2006 | Veenstra et al. | 374/142 |

FOREIGN PATENT DOCUMENTS

| | | |
|---|---|---|
| EP | 0 536 836 A1 | 4/1993 |
| EP | 0 682 862 A2 | 11/1995 |
| EP | 1 230 844 A1 | 8/2002 |
| FR | 2 720 013 A1 | 11/1995 |
| GB | 911701 | 11/1962 |
| GB | 1051347 | 12/1966 |
| GB | 1 549 131 | 7/1979 |
| GB | 761774 | 11/1986 |
| SE | 515 114 | 3/2001 |
| WO | WO99/03331 | 1/1999 |
| WO | WO99/66786 | 12/1999 |

* cited by examiner

METHOD AND AN ARRANGEMENT AT A DAIRY FARM

TECHNICAL FIELD OF THE INVENTION

The present invention relates generally to dairy farm machine milking and to cleaning related thereto.

DESCRIPTION OF RELATED ART AND BACKGROUND OF THE INVENTION

When a milking animal, such as a cow, presents itself for milking it is important to ensure that the teat cups to be attached to the teats of the milking animal are clean and free of any condition that could contaminate the teats of the milking animal. This need applies to both manual and automatic application of milking apparatus.

Therefore, it is customary to clean the teat cups between the milking of each milking animal, where either a cleaning liquid or pure water is used.

It is also customary, for the same reason, to clean the teats of each milking animal prior to the attachment of the teat cups. For teat cleaning, dedicated teat cleaning cups or brushes may be employed.

However, while such cleaning removes dirt from the teats and provides for an overall hygienic environment, there is nevertheless a risk of communicating infections, such as for instance mastitis, from one animal to another.

In Research Disclosure, April 2000, publication No. 444037, p. 530, is proposed to spray the surfaces of the teat cups and the teat cleaning cups that potentially are exposed to the animals with hot steam to heat up the surfaces to a temperature, at which bacteria are killed. It is also proposed to illuminate the surfaces with UV light.

SUMMARY OF THE INVENTION

Problems encountered while implementing such a steam spraying functionality in existing milking machines include that the sterilization requires high energy, is slow and/or leave the teat cups too hot. The high energy needed and the slow process result in an inefficient sterilization process, while the latter problem may result in that the animals burn themselves and/or in that the milking has to be delayed in order to let the teat cups cool off.

Accordingly, it is an object of the present invention to provide an arrangement and a method for cleaning in an automated milking system, which overcome at least some of the problems associated with prior art.

It is in this respect a particular object of the invention to provide such an arrangement and such a method that are uncomplicated, effective, accurate, reliable, safe, and of low costs.

These objects among others are attained by arrangements and method as claimed in the appended patent claims.

Further characteristics of the invention, and advantages thereof, will be evident from the detailed description of preferred embodiments of the present invention given hereinafter and the accompanying FIGS. 1-6, which are given by way of illustration only, and thus are not limitative of the present invention.

In the following detailed description the milk producing animals are cows. However, the invention is not limited to cows, but is applicable to any animals having the capability to produce milk, such as sheep, goats, buffaloes, horses, etc.

BRIEF DESCRIPTION OF THE DRAWINGS

FIG. 4b illustrates, schematically, in a cross-sectional side elevation view the teat-cleaning cup of FIG. 4a.

DETAILED DESCRIPTION OF EMBODIMENTS

Figure 1:
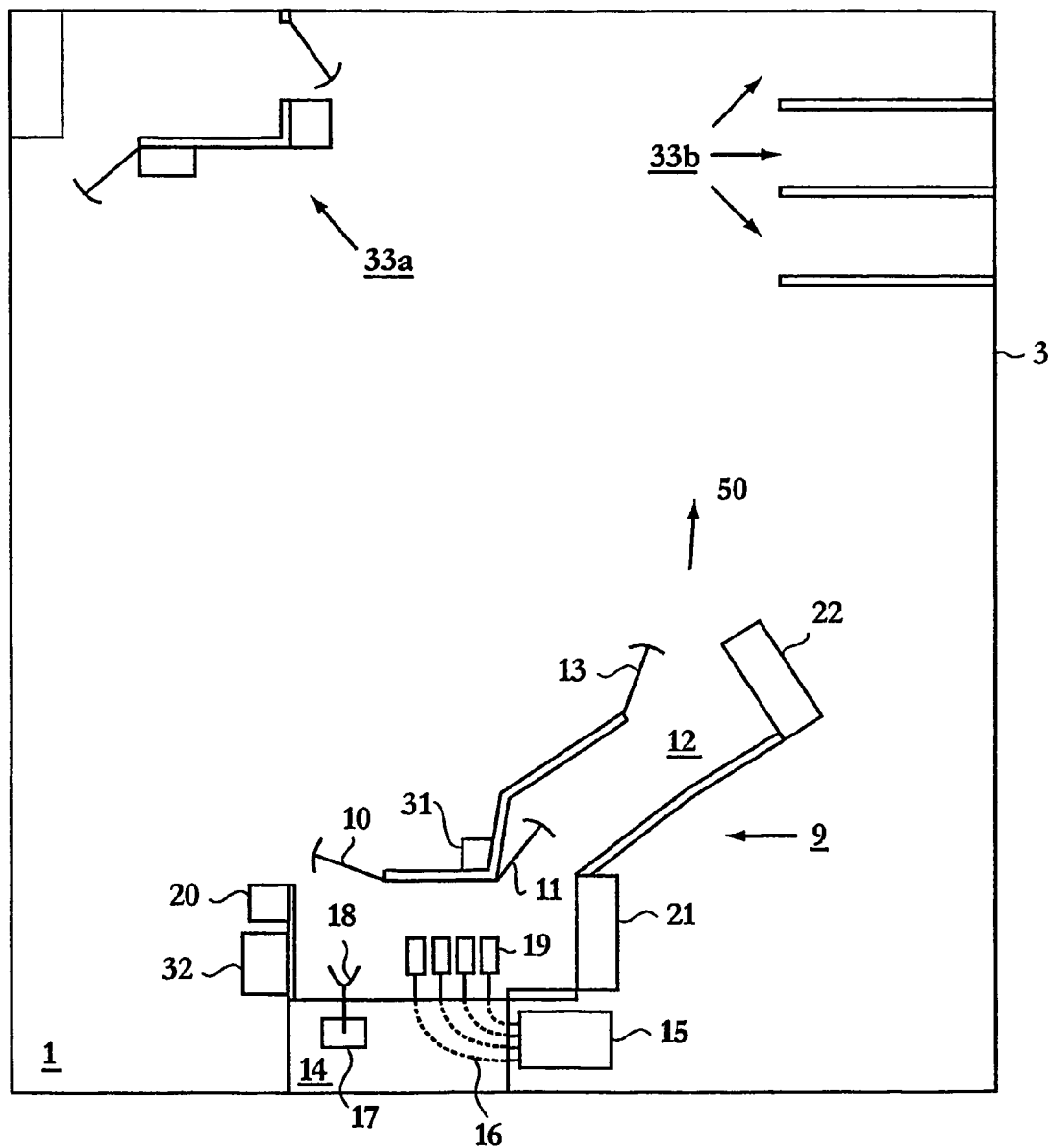
FIG. 1 illustrates, schematically, an embodiment of an animal arrangement for housing a herd of cows including an automated milking station, wherein the method and arrangement according to the present invention may be implemented.

FIG. 1 illustrates an animal arrangement for housing a herd of cows, in which cleaning arrangements of the present invention may be implemented. The arrangement comprises an area 1 defined by enclosure means 3 in the shape of a fence, a grid or the like. In the area 1, there is provided a milking station 9 arranged for voluntary milking of the freely walking cows, i.e. the cows enter the milking station 9 in order to be milked when they want to. The milking station 9 comprises an enclosure having an inlet gate 10 and an outlet gate 11. Outside of the outlet gate 11, there may be an exit space 12 to be passed by the cow leaving the milking station. The exit space 12 comprises a further outlet gate 13.

The milking station 9 comprises an automatic milking machine 14 connected to a milk storage tank 15 by means of milk lines 16. The milking machine 14 includes an automatic handling device or robot 17 having a robot arm 18 provided with a gripper. The handling device 17 is arranged to automatically apply teat cups 19 of the milking machine to the teats of a cow present in the milking station 9 prior to milking.

Figure 3:
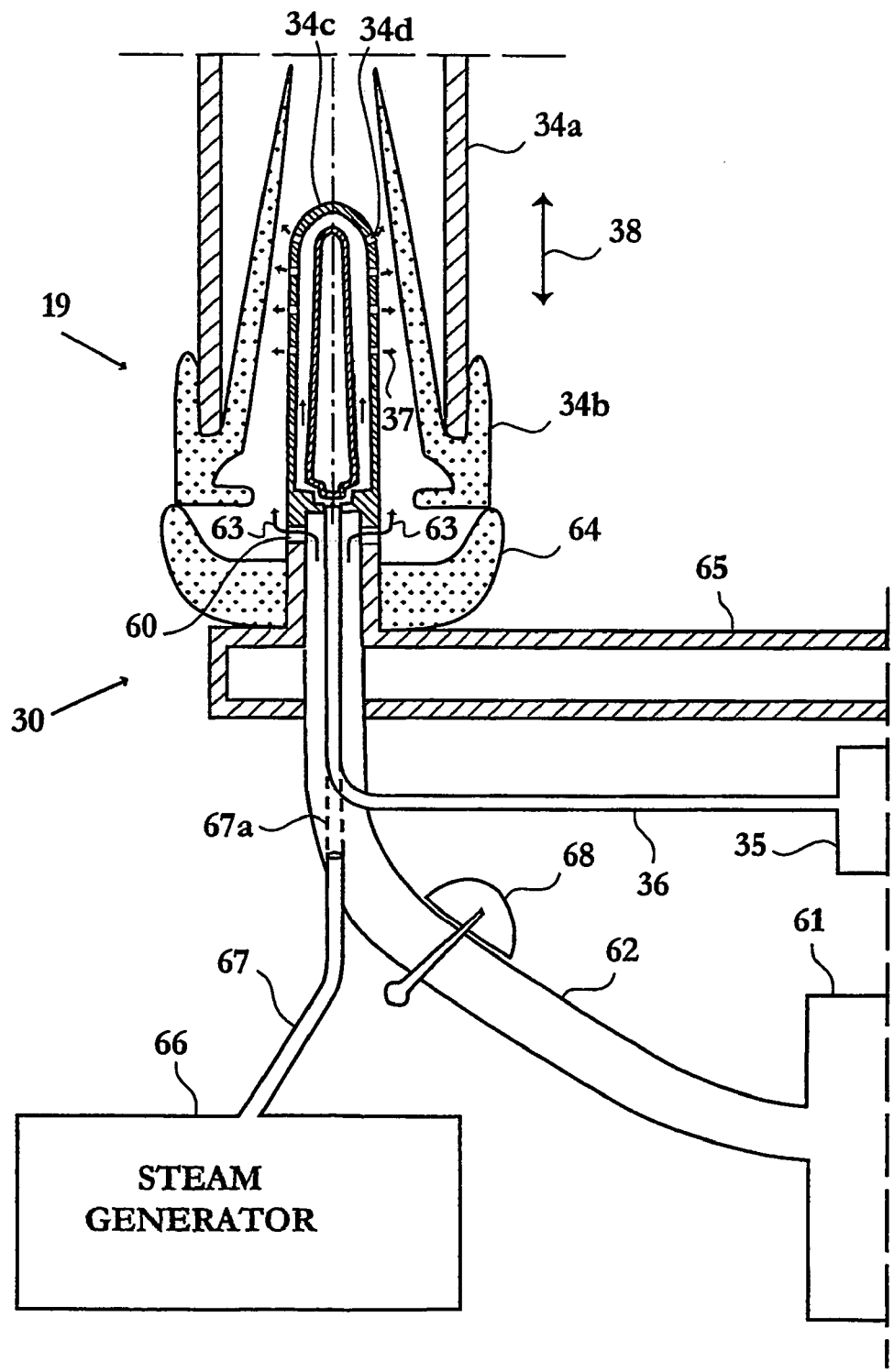
FIG. 3 illustrates, schematically, in a cross-sectional side elevation view a portion of a teat cup of the automated milking station of FIG. 2 and an arrangement for teat cup cleaning according to an embodiment of the present invention.

Each teat cup includes a substantially cylindrical rigid shell and an internal flexible liner, which can be seen in the upper portion of FIG. 3 as details 34a and 34b. The liner 34b is located within the shell 34a and extends through the bottom thereof as a milk tube, which is connected to a source of vacuum (not illustrated). The annular space, between the teat cup shell 34a and the teat cup liner 34b, is connected to a source of pulsating vacuum (not illustrated).

Furthermore, the milking station 9 comprises an identification member 20 provided to identify a cow approaching the milking station 9. All of the gates 10, 11 and 13 are controllable by means of a schematically disclosed gate control device 31.

The automatic handling device 17, and the gate control device 31 are connected to a central processing and control device 32, which is responsible for central processing and controlling of the animal arrangement, and comprises typically a microcomputer, suitable software, and a database. Such a database includes typically information of each of the cows in the area 1, such as e.g. when the respective cow was milked last time, when she was fed last time, her milk production, her health, etc. Particularly, the database may store information such as whether the respective cow has mastitis or any other infection, which of her teats are infected, etc.

A cow approaching the milking station may thus be given access to the milking station after having been identified by the identification member 20 by opening the inlet gate 10.

During milking, milk is drawn from the teats of the cow by means of vacuum being applied to the teat cups 19. The milk drawn is measured by means of one or several milk meters (not illustrated), whereafter it is collected in milk storage tank 15. Preferably, there is provided a milk meter for each teat cup for measuring the individual milk flow from each teat. Further, each teat cup is preferably connected individually by means of respective milk line 16 to milk storage tank 15. After the milking has been completed the outlet gates 11 and 13 are opened and the cow may leave the milking station 9.

The milking station 9 may also comprise a first feeding device 21 provided in the front end of the milking station 9 and a second feeding device 22 provided in the front end of the exit space 12, the purposes of which being to entice the cow to enter the milking station 9 for milking and to leave the milking station 9 after the milking has been finished.

Furthermore, area 1 houses a feeding station 33a and resting stations 33b accessible to the cows, i.e. the cows enter the feeding and resting stations 33a, 33b in order to eat, drink, and rest when they want to.

Figure 2:
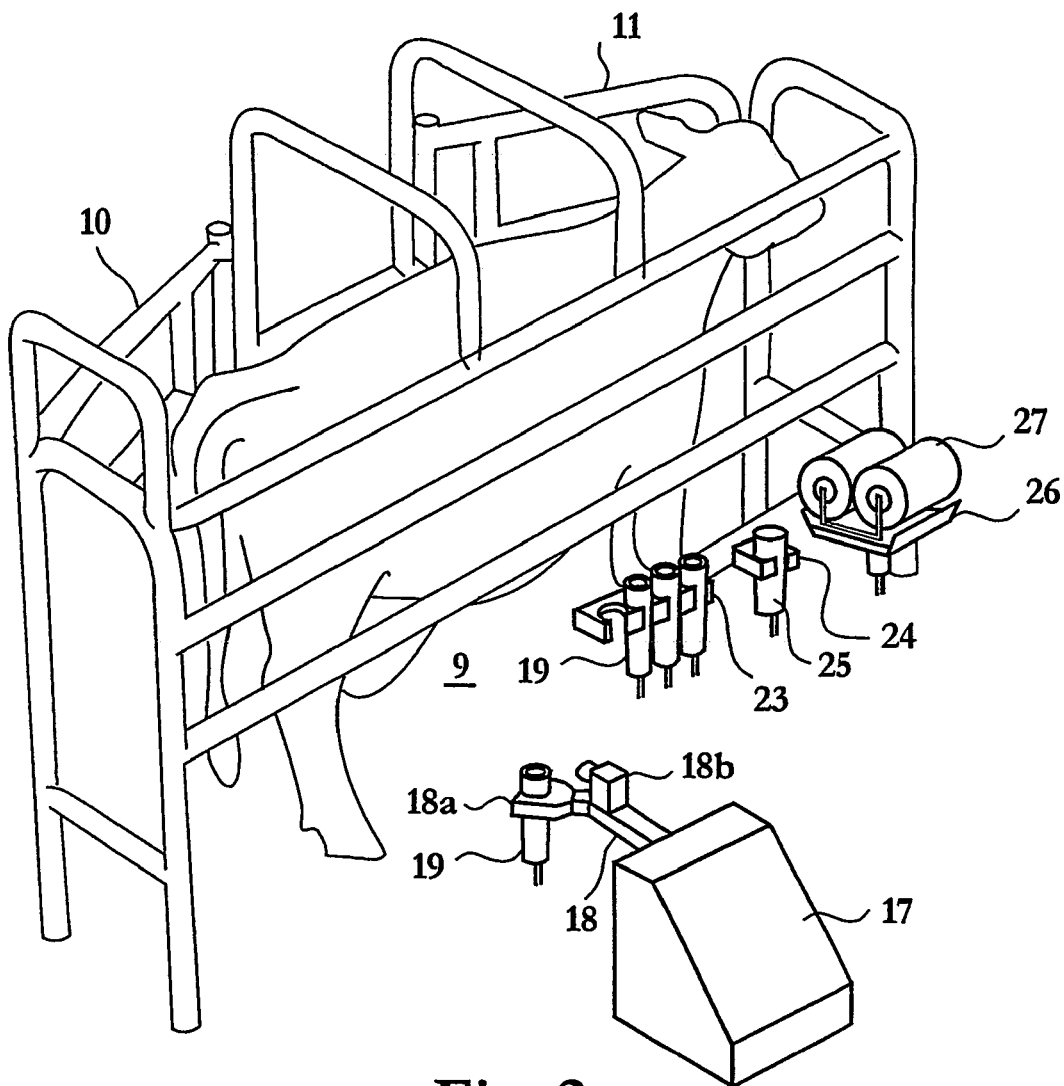
FIG. 2 illustrates, schematically, in a perspective view portions of the automated milking station of FIG. 1.

In FIG. 2 portions of the milking station are schematically illustrated in a perspective view. Three of the teat cups 19 are arranged in a teat cup rack or magazine 23, whereas the fourth one is held by the gripper, denoted here by 18a, of the robot 17.

The robot arm 18 is further provided with a camera 18b or other optical sensor means or image capturing device, which is connected to the central processing and control device and adapted to establish presence, location, and possibly orientation, of the teat cups 19 and of the teats of the cow to be milked, such that the central processing and control device 32 is capable of controlling the robot 17 to grip the teat cups 19, one at a time, and apply them to the teats of the cow, possibly firstly after analyzing the images. During milking, the teat cups 19 are held in place by means of the applied vacuum. When the milking is terminated the teat cups are returned to the rack 23.

Further, the robot 17 is arranged to grip, move and release teat cleaning, and possibly desinfection, devices, which are used, prior to milking, for cleaning the teats of the cow. Preferably, the central processing and control device 32 is then capable of recognizing different kind of animal related devices and components, such as cleaning devices and teat cleaning cups. In this respect the devices and components may be provided with identification tags such as e.g. readable bar codes.

In FIG. 2 two different teat cleaning devices are illustrated: a teat-cleaning cup 25 and a brush-based device 27, each mounted in a rack 24, 26.

Figure 4A:
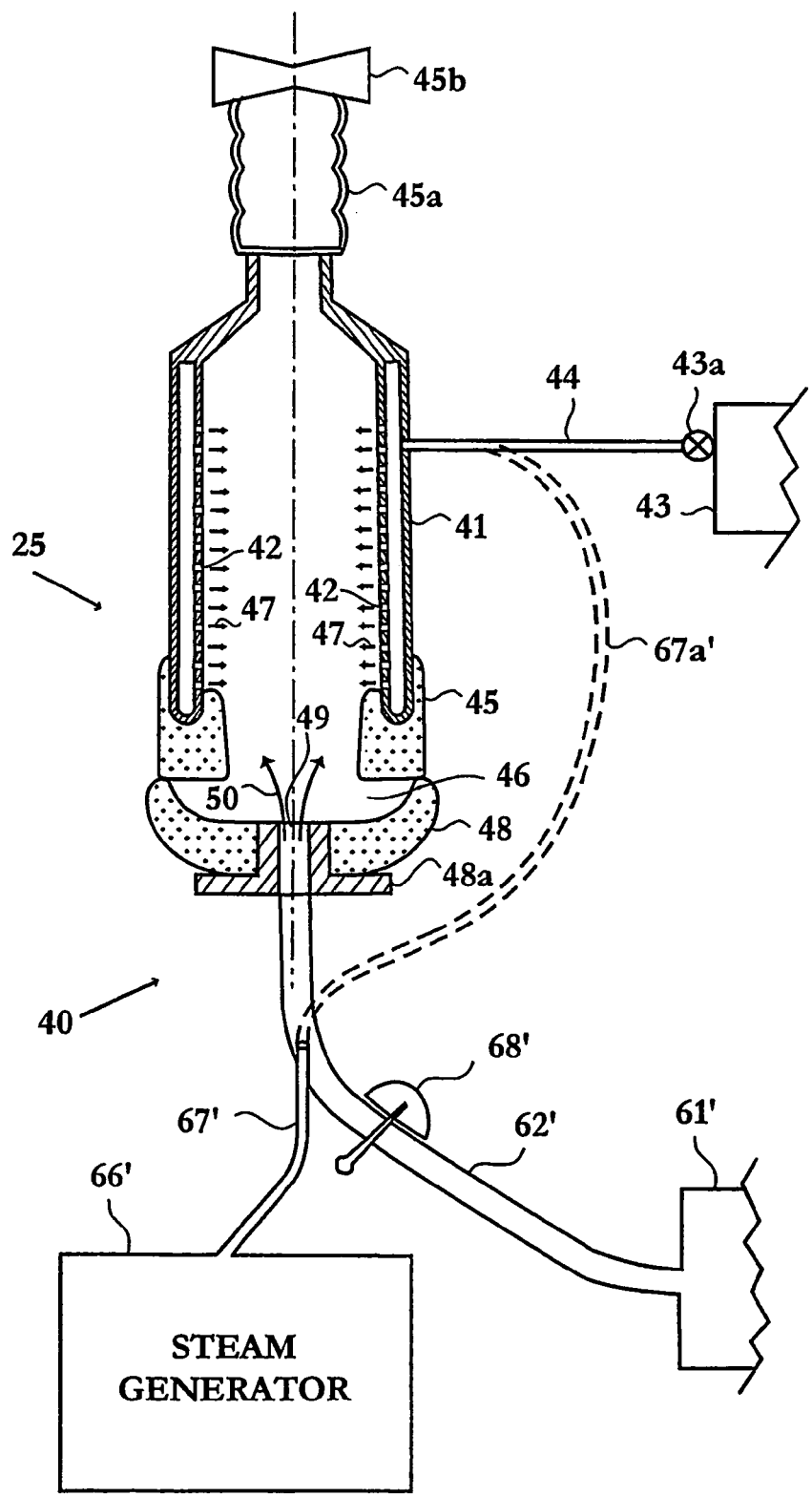
FIG. 4a illustrates, schematically, in a cross-sectional side elevation view a teat-cleaning cup of the automated milking station of FIG. 2 and an arrangement for cleaning the teat-cleaning cup according to an embodiment of the present invention.
Figure 4B:
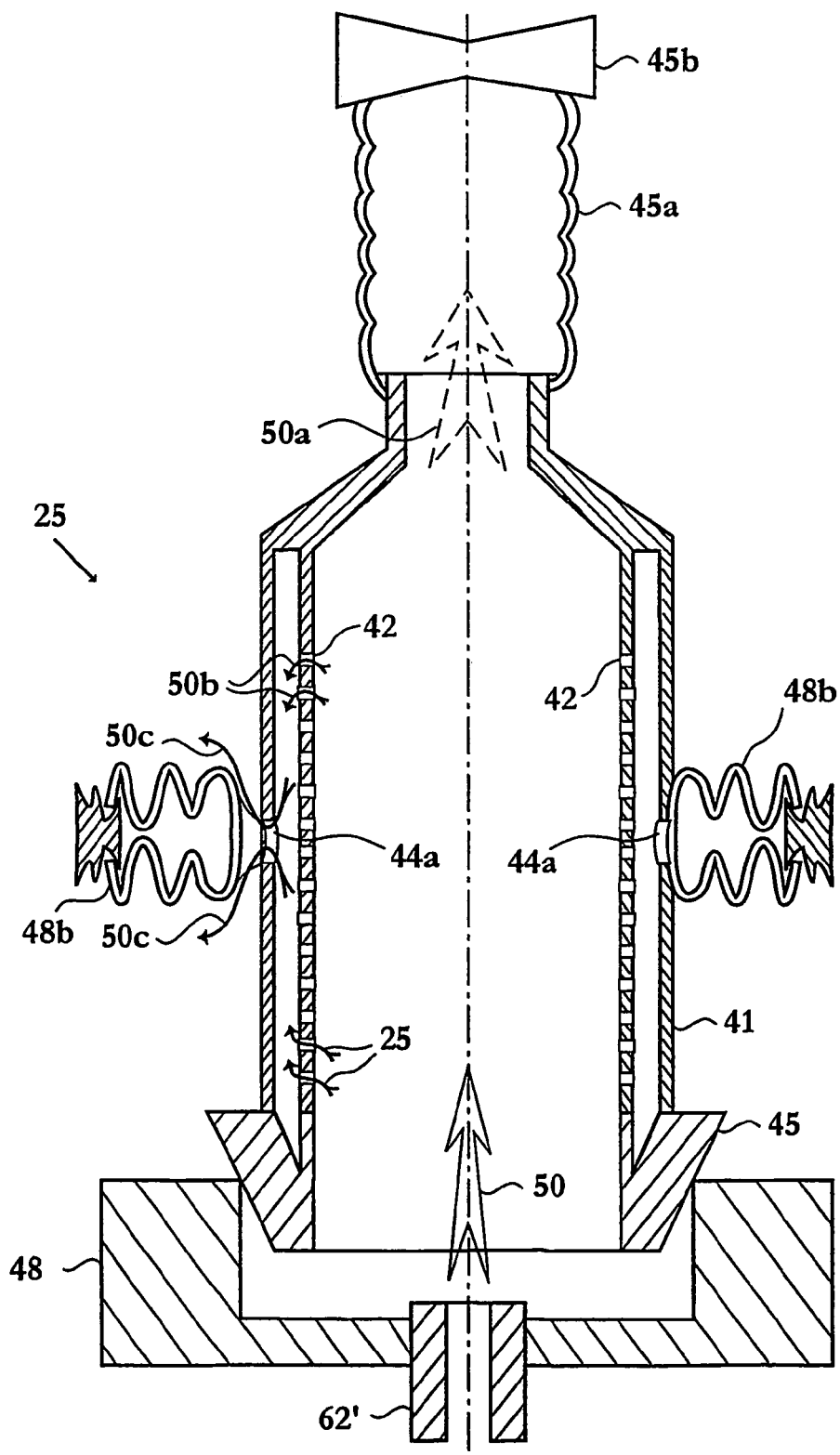

The teat cleaning cup 25, which is illustrated in more detail in FIGS. 4a-b, includes a double walled essentially cylindrical cup shell 41 of a non-collapsible material, wherein the inner wall is provided with a plurality of holes 42 and the annular space between the walls is divided into channels, of which some are connected to a supply 43 of cleaning fluid or a mixture of fluids via a supply line 44 provided with a valve 43a, and some channels are connected to the ambient air via openings 44a. Preferably, the channels are located side by side along the periphery of the annular space, and thus the cross-sectional side elevation views of FIGS. 4a-b are slightly rotated with respect to each other.

The double walled cup shell 41 is in one end provided with a ring-shaped collar 45 of a flexible material, which defines a teat receiving opening 46, and is in another end connected to an evacuation hose 45a provided with a valve 45b, the evacuation hose being in turn connected to a vacuum source (not illustrated).

Note that the design of the cup shell 41 and the collar 45 are slightly different in FIGS. 4a-b. Nevertheless, they are fully exchangeable as regards their function and use.

During cleaning of the teats of a cow, the robot grips the cleaning cup 25 and attaches it sequentially to the teats of the cow such that the teats, one at a time, are received in the teat receiving opening 46. Cleaning fluid is then supplied to channels of the annular space of cup shell 41 and is forced to be ejected through holes 42 as radially directed jets towards the teat, to which the cleaning cup 25 is attached, in the directions of arrows 47 in FIG. 4a. Simultaneously herewith, the valve 45b is opened and ambient air is, by way of the vacuum applied, sucked through the openings 44a, into channels of the annular space, and through holes 42 to be mixed with the cleaning fluid to enhance the cleaning operation. The cleaning fluid and the air are then evacuated through the evacuation hose 45a or through the ring-shaped collar 45.

The holes 42 are distributed around the circumference of the inner wall and may be oriented such that the jets of cleaning fluid and the flow of air are slightly axially directed and/or tangentially directed to achieve a rotational movement of fluid in the cleaning cup 25 for optimum cleaning result. Pure water or a cleaning detergent may be used as the cleaning fluid.

The brush-based device 27 includes typically two brushes arranged side by side, which are rotated in opposite directions while the teats are sequentially arranged between the brushes to obtain wiping movements onto the teats downwards towards the floor to remove soil and dirt present at the teats. Optionally, a cleaning fluid supply (not illustrated) sprays a cleaning fluid onto the teats to enhance the cleaning.

Such teat cleaning devices have found widespread use in automated milking stations. Nevertheless, recent investigations may suggest that such cleaning is not effective with regard to the spreading of microorganisms and bacteria, which may transfer infectious illnesses or infections from cow to cow.

The present invention concerns arrangements and methods for cleaning, and particularly for impeding transmission of infectious illnesses and infections, in an automated milking system, which have several advantages over prior art approaches, which are apparent from the present description.

A first inventive arrangement for cleaning in an automated milking system is illustrated in FIG. 3 together with portions of a teat cup 19. The arrangement, denoted by reference numeral 30, includes an elongated substantially cylindrical double walled cleaning member 34c, the outer wall of which including a plurality holes 34d, which are oriented substantially radially with respect to the cylindrical cleaning member 34c. optionally, the plurality holes 34d are slightly axially and/or tangentially oriented.

The annular space formed between the walls of the cleaning member 34c is in fluid communication with a supply of cleaning fluid 35 via a cleaning fluid supply line 36. The supply of cleaning fluid 35 is provided with a pump or similar (not explicitly illustrated) such that cleaning fluid is capable of being transported through the cleaning fluid supply line 36 and through the annular space to be ejected as a plurality of jets through the holes 34d.

The jets, which are directed as indicated by arrows 37, impinge onto the inner surface of the liner 34b of the teat cup 19 and remove milk and other residues before proteins therein coagulate and get stuck on the surface. The cleaning fluid may be pure water, a cleaning detergent, or a mixture of either pure water or cleaning detergent, or both, and air. The temperature of the cleaning fluid is of room temperature or is tempered to a temperature of 25-45° C., more preferably 30-40° C., and most preferably about 35° C.

The cleaning member is further provided with a large orifice 60 in a lower end portion thereof, the orifice 60 being in fluid communication with a washing machine 61 via a washing machine supply line 62. The washing machine 61 is provided with or connected to a washing fluid supply, a pump and a source of vacuum (not explicitly illustrated) and is used for washing the automated milking system on a regular basis, such as e.g. three times a day. During such washing, fluid is circulated in the system, preferably in a forward flush-kind of manner, i.e. washing fluid is transported from the washing machine 61, via the washing machine supply line 62, through the orifice 60 as indicated by arrows 63 and up into the teat cup 19 and through the milk line connected thereto. Alternatively, washing is performed in a back flush-kind of manner, i.e. washing fluid is transported from the washing machine 61, through the milk line the teat cup 19, and the orifice 60 and is collected in a tank via the washing machine supply line 62.

In order not to leak washing fluid, the cleaning member 34c is provided with a sleeve 64 of a flexible material downstream of the orifice 60. The sleeve 64 seals against the liner 34b of the teat cup 19 such that no washing fluid will pass by there. The sleeve 64 is provided with sealed lead-through(s) for the supply lines 36 and 62. Further, the cleaning member 34c is typically supported by a support or rack 65.

The arrangement includes also a steam generator 66 which is in fluid communication with washing machine supply line 62, and thus with the orifice 60 of the cleaning member 34c, via a steam supply line 67. Preferably, the steam supply line 67 is connected to the washing machine supply line 62 in immediate vicinity of the orifice 60. Still preferably, the steam supply line 67 ends within the washing machine supply line 62 and/or ends in a direction, which is parallel with the washing machine supply line 62 directly downstream thereof.

In addition, the steam supply line 67 may be connected to the cleaning fluid supply line 36 as being illustrated by the dashed line 67a.

Further, a controllable valve 68 is arranged in the washing fluid supply line 62 upstream of the connection between the steam supply line 67 and the washing machine supply line 62 for shutting off the washing machine supply line 62, while steam is supplied.

A typical cleaning sequence for cleaning of a teat cup is as follows.

1. The cleaning member 34c is inserted into the liner 34b of the teat cup 19 as is illustrated in FIG. 3. Preferably the teat cup is oriented with the teat receiving opening downwards as indicated.
2. The inner and optionally end surfaces of the teat cup liner 34b are cleaned by means of flowing cleaning fluid through the cleaning fluid supply line 36, through the annular space, and through the holes 34d. The thereby ejected jets impinge onto the inner surface of the teat cup liner 34b and remove milk and other residues.

In order to clean all parts of the liner surface, the cleaning member 34c may be moved vertically with respect to the teat cup 19 as indicated by the arrow 38 during the supply of cleaning fluid.
3. The fluid in the teat cup 19 and in the sleeve 64 is evacuated. Most of the fluid (and milk residues) is removed from the teat cup by means of its own gravity (with the orientation of the teat cup as illustrated). Remaining fluid can be evacuated by means of sealing the sleeve 64 towards the teat cup liner 34b and applying vacuum to the washing fluid supply line 62, to the cleaning fluid supply line 36, or to both. For the latter purposes the supply of cleaning fluid 35 may be provided with, or connected to, a source of vacuum (not illustrated). The remaining fluid can thus be sucked away from the teat cup 19/sleeve 64.

Alternatively, the fluid can be evacuated by exposing the teat cup 19 and the sleeve 64 to compressed air.

By means of removing substantially all fluid, less steam energy is needed to heat up the teat cup liner to a given temperature (since no energy is wasted in heating and evaporating the remaining fluid).
4. The valve is shut off to reduce the volume to be heated up by the steam.
5. Hot steam is supplied into the teat cup liner 34b from the steam generator via the steam supply line 67, the washing fluid supply line and the orifice 60. The steam thus enters the teat cup as the washing fluid does during milking system washing (indicated by arrows 63).

The steam shall be sufficiently hot such that it heats up the teat cup liner 34b to a temperature where micro-organisms and bacteria are killed, or at least rendered harmless. Such disinfection or sterilization shall preferably be performed of the complete interior of the teat cup liner 34b. Since the teat cup liner 34b may be of a porous rubber material, the steam exposure shall preferably be powerful enough such that steam can penetrate into the surface of the liner 34b and ensure a complete disinfection of the liner 34b.

Sterilization or disinfection of the teat cup shall preferably be performed externally as well. In the illustrated case the external liner surface of the teat cup 19 facing downwards will be exposed to steam to a boundary where the sleeve 64 seals towards the teat cup liner.

It shall be appreciated that by modifying the sleeve 64, it will be possible to sterilize further external surfaces of the teat cup 19. Alternatively, other means are provided for disinfecting such external surfaces of the teat cup 19, such as e.g. separate steam supply devices and/or enclosure means enclosing such external surfaces and being connected to the steam generator 66 (not illustrated).

If the steam supply line 67 is connected also to the cleaning fluid supply line 36, hot steam may be supplied into the teat cup liner 34b also through the plurality of holes 34d.

The steam sterilization or disinfection operation may be performed in forward or back flush modes.
6. The teat cup liner 34b is cooled by means of flushing a cooling fluid, which typically is water and/or air or other gas, through either ones of the supply lines 36 and 62 to quickly decrease the temperature of the teat cup liner 34b such that the teat cup can be applied to the teat of a cow immediately without any risk of the teat getting burned.

7. The cleaning member 34c is removed from the teat cup 19.

Note that alternatively or additionally step 3 may be performed between steps 6 and 7, particularly if a liquid is used in step 6. Such evacuation prior to milking ensures that the teat cup will not contain any cooling fluid, which would possibly be collected in the milk tank of the automated milking system.

By having the teat cup oriented with the teat receiving opening downwards, as indicated in FIG. 3, and operate the cleaning in back flush mode it can ensured that no fluid is entered into the milk line connected to the teat cup, which could have dissolved milk proteins and contaminants stuck on the inner surfaces thereof and transported these to the teat cup 19.

The cleaning sequence is typically performed immediately before or, more preferably, immediately after the milking of a cow. In an automated milking system, where the cows are milked continuously, the cleaning sequence is typically performed once between each milking of a cow. In one version the steps 1-3 are performed immediately after the milking of a cow, whereas the steps 5-7 are performed immediately before the milking of a subsequent cow.

It shall be appreciated that while it is possible to use a single cleaning member for cleaning four teat cups sequentially, the arrangement is preferably provided with four parallel cleaning members (not illustrated), each connected to the cleaning fluid supply 35, to the washing machine 61 and to the steam generator 66 individually, wherein four teat cups are cleaned in parallel by employment of the cleaning sequence described above.

Still preferably, the teat cups are cleaned while they are located in a default position in a magazine or rack (not illustrated). Thus, such a preferred magazine stores the teat cups with their respective teat receiving openings facing the floor.

With reference next to FIGS. 4a-b a second inventive arrangement for cleaning in an automated milking system will be described.

The arrangement, denoted by reference numeral 40, includes a cleaning member in the form of a sleeve 48, preferably of a flexible material, and capable of sealing towards the ring-shaped collar 45 of the teat cleaning cup 25. The sleeve 48 may be supported by a support or rack 48a and has a sealed lead-through 49 through which a supply line 62' is inserted. The supply line 62' is connected to a cleaning device 61', which is provided with or connected to a cleaning fluid supply, a pump and a source of vacuum (not explicitly illustrated) and is used for cleaning of the cleaning cup 25. During such cleaning, a fluid is flown from the cleaning device 61', via the supply line 62', and up into the teat cleaning cup 25 as indicated by arrows 50.

Alternatively, the cleaning device 61' and the supply line 62' may be dispensed with and the cleaning of the teat cleaning device may be performed by means of supplying cleaning fluid or a mixture of fluids from the supply 43 via the supply line 44.

Further, the openings 44a are covered by rubber bellows 48b or other elastic sealing means.

The arrangement includes a steam generator 66', which is in fluid communication with the supply line 62' via a steam supply line 67'. Preferably, the steam supply line 67 is connected to the supply line 62' in immediate vicinity of the cleaning member 48. Still preferably, the steam supply line 67' ends within the supply line 62' and/or ends in a direction which is parallel with the supply line 62' directly downstream thereof. Further, a controllable valve 68' is arranged in the supply line 62' upstream of the connection between the steam supply line 67' and the supply line 62' for shutting off the supply line 62', while steam is supplied. If the cleaning device 61' and the supply line 62' are not present, the steam supply line 67' is extended to pass through the sealed lead-through 49 of the sleeve 48.

In addition, the steam supply line 67' may be connected to the cleaning fluid supply line 44 as being illustrated by the dashed line 67a'.

A typical cleaning sequence for cleaning of a teat-cleaning cup is as follows.

1. The cleaning member 48 is sealed against the teat receiving opening 46 of the teat-cleaning cup 25 as is illustrated in FIG. 4a. Preferably the teat-cleaning cup 25 is oriented with the teat receiving opening downwards as indicated.

2. The inner and optionally end surfaces of the teat-cleaning cup 25 are cleaned by means of flowing cleaning fluid through either ones of the supply lines 44 and 62'.

Optionally, the valve 45b is sequentially opened and closed to allow cleaning fluid supplied through the supply line 62' to flow alternately into the evacuation hose 45a as indicated by arrows 50 and 50a in FIG. 4b, and through holes 42 and openings 44a as indicated by arrows 50, 50b and 50c in FIG. 4b.

Still optionally, the outer surfaces of the teat-cleaning cup 25, i.e. of the ring-shaped collar 45, may be cleaned by any means known in the art.

3. The fluid in the teat-cleaning cup 25 and in the sleeve 48 is evacuated. Most of the fluid (and milk residues) is preferably removed from the teat-cleaning cup by means of its own gravity (with the orientation of the teat cleaning cup as illustrated). Remaining fluid can be evacuated by means of sealing the sleeve 64 towards the teat cup liner 34b and applying vacuum to the supply line 62' or to the teat cleaning cup 25. Hereby, remaining fluid is sucked away from the teat cup/sleeve. Alternatively, the fluid may be evacuated via the evacuation hose 45a.

By means of removing substantially all fluid, less steam energy is needed to heat up the teat cup liner to a given temperature.

4. The valve 68' is shut off to reduce the volume to be heated up by the steam.

5. Hot steam is supplied into the teat cleaning cup 25 from the steam generator 66' via the steam supply line 67', and the supply line 62' (if present). The steam thus enters the teat cup as indicated by arrows 50.

The steam shall be sufficiently hot such that it heats up the inner surfaces of the teat-cleaning cup 25 to a temperature where microorganisms and bacteria are killed.

The valve 45b may be sequentially opened and closed to allow steam supplied through the supply lines 67', 62' to flow alternately into the evacuation hose 45a as indicated by the arrows 50 and 50a in FIG. 4b, and through holes 42 and openings 44a as indicated by the arrows 50, 50b and 50c in FIG. 4b.

Alternatively, or complementary, steam may be supplied via the lines 67a', 44 and into the teat cleaning cup via the holes 42 as indicated by the arrows 47 in FIG. 4a.

In either case, steam is supplied through the holes 42 to effectively sterilize or disinfect the holes 42, where contaminants are probable to get stuck.

6. The teat cleaning cup is cooled by means of flushing a fluid, which typically is water and/or air, through either ones of the supply lines 44 and 62' to quickly decrease the temperature of the teat cleaning cup 25 such that the teat cleaning cup can be applied to the teat of a cow immediately without any risk of the teat getting burned.
7. The cleaning member 48 is removed from the teat-cleaning cup 25.

The cleaning sequence is typically performed immediately before or, more preferably, immediately subsequent to the cleaning of the teats of each cow.

The single teat-cleaning cup is used for cleaning the teats of a cow sequentially. It may happen that a particular cow has one or several infected teats, and still at least one healthy teat. If such information is available, e.g. as information from the database comprised in the central processing and control device 32 or as deduced from in situ measurements, the order in which the teats are cleaned by the teat cleaning cup 25 is selected such healthy teats are cleaned firstly and infected teats at the end. By such provisions it is ensured that a healthy teat will not be contaminated by an infected teat through the teat-cleaning cup 25, and it is still sufficient to sterilize the teat-cleaning cup once for each cow put through the milking station.

In another version of the invention there is provided four teat-cleaning cups, one for each teat to be cleaned (not illustrated).

Preferably, the teat-cleaning cup is cleaned while it is located in a default position in a magazine or rack (not illustrated). Thus, such a preferred magazine stores the teat-cleaning cup with its respective teat-receiving opening facing the floor.

It shall be appreciated that while a particular teat-cleaning cup has been described, the cleaning sequence, or at least a portion thereof, is applicable to other kind of teat cleaning devices. For instance, hot steam may be supplied to the brush-based teat cleaning device 27 from the steam generator 66' via the steam supply line 67', and the supply line 62' (if present) in order to sterilize the brushes of the device 27 and other components possibly exposed to the cow.

Figure 5:
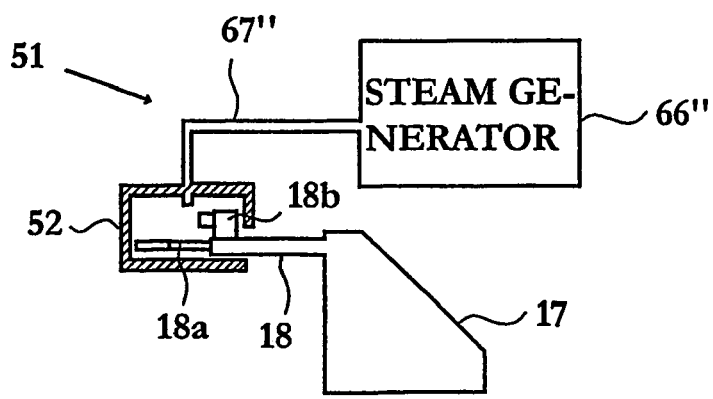
FIG. 5 illustrates, schematically, in a side elevation view a robot of the automated milking station of FIG. 2 and an arrangement for cleaning the robot according to an embodiment of the present invention.

With reference next to FIG. 5, which schematically illustrates a robot of the automated milking station of FIG. 2 and an arrangement for cleaning the robot, another embodiment of the present invention will be described.

The present inventors have surprisingly discovered that there may be a risk of transmitting infectious diseases despite the teat cups and teat cleaning devices being appropriately disinfected or sterilized. It has been discovered that the robot 17, its robot arm 18, gripper 18a and camera 18b may constitute a source of transmission of infection. The robot arm is moving in the region of the teats while attaching the teat cleaning cup 25 and the teat cups 19 to the teats of the cows. Particularly, when attaching cups to rear teats it is assumed that the gripper 18a and/or the upper surface of the camera 18b may come into contact with one of the front teats. If this is repeated for many cows there is a risk of transmitting infection from one cow to another.

Thus, the cleaning arrangement of FIG. 5, denoted by reference numeral 51, includes a docking station 52, i.e. an enclosed space, wherein the robot arm 18 with the gripper 18a and the camera is insertable, and a steam generator 66" in fluid communication with the docking station 52 via a steam supply line 67".

During sterilization the robot arm is inserted into the docking station 52, and steam is supplied to the docking station 52 via the steam supply line 67" to sterilize the front portion of the robot arm 18, the gripper 18a and the camera 18b. It has naturally to be ensured that a camera is provided, which can withstand the steam supplied.

In alternative versions, only the gripper 18a or the camera 18b, or portions thereof, are exposed to hot steam in order to be sterilized.

Additionally, or alternatively, the robot arm, the gripper 18a and/or the camera 18b, or portions thereof, are disinfected by other means known in the art, e.g. through exposure to UV light or other radiation, to ultrasonic waves, or to chemicals.

It shall be appreciated to the man skilled in the art that the arrangements of FIGS. 3, 4 and 5 may be combined two and two, or all three together, in the milking station. In such an instance the steam generators 66, 66' and/or 66" may be exchanged for a single steam generator.

Figure 6A:
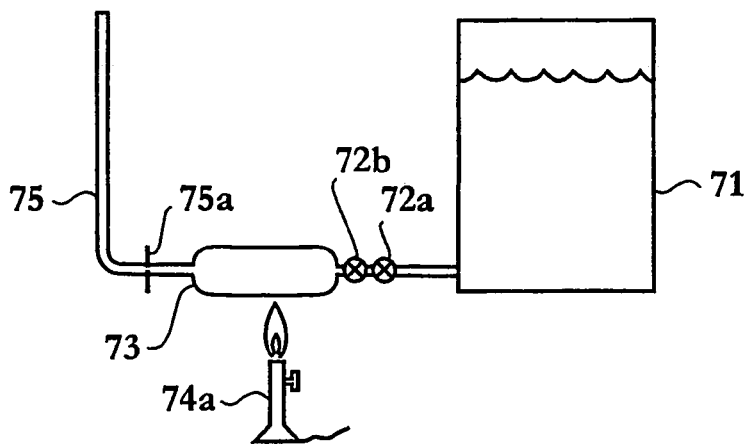
FIGS. 6a-c illustrate, schematically, in side elevation views arrangements for cleaning according to yet further embodiments of the present invention.
Figure 6B:
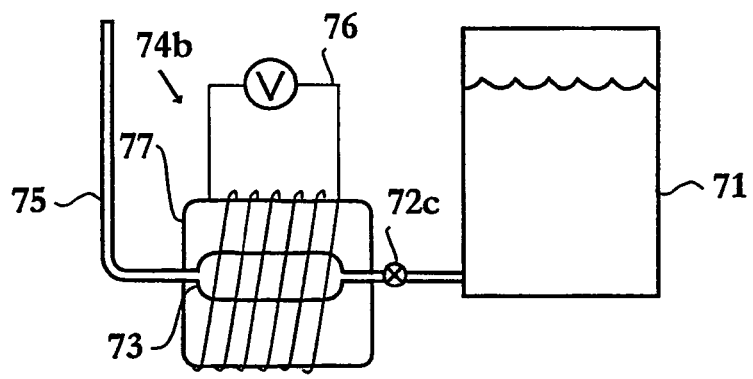
Figure 6C:
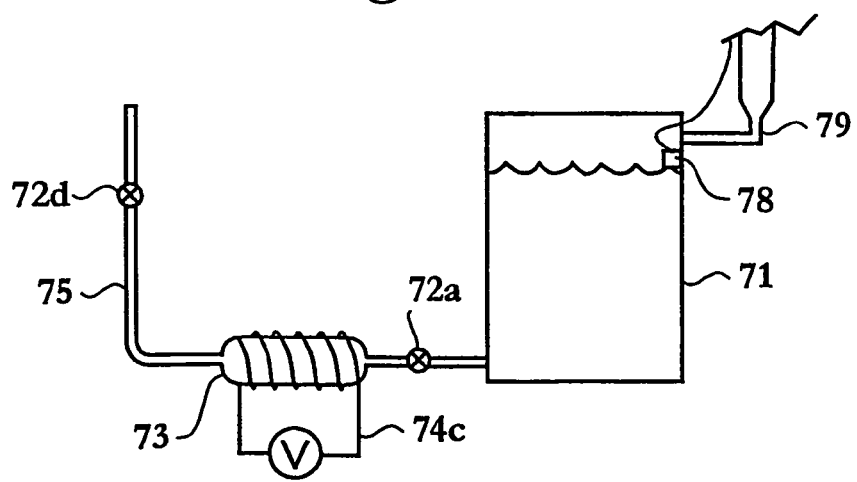

With reference now to FIGS. 6a-c three inventive steam generator arrangements will be described. Each of the arrangements comprises a water tank 71 for storing an amount of water; means 72a-d for regulating a flow of water from the water tank 71; a chamber 73 for receiving the flow of water, where the chamber is capable of housing only a fraction of the amount of water capable of being stored in the water tank 71; a heating device 74a-c for generating steam from water housed in the chamber 73; and an output line 75 for outputting the steam as generated.

Preferably, the water tank and the chamber are located with respect to each other to cause a flow of water from the water tank 71 to the chamber 73 by means of gravity. However, in an alternative version a pump is used to pump water from the water tank 71 to the chamber 73 (not illustrated).

The first embodiment, illustrated in FIG. 6a, includes a nonreturn valve 72a to prevent water or steam from passing from the chamber 73 to the water tank 71, and optionally a temperature-controlled valve 72b connected to prevent water from flowing from the water tank 71 to the chamber 73 if a temperature of the chamber is below a selected temperature and to allow water to flow from the water tank 71 to the chamber 73 if the temperature is above the selected temperature.

The temperature-controlled valve 72b may be a bimetallic sensor-based valve, or any other kind of temperature sensor may be located inside the chamber (not illustrated) and arranged to control the valve 72b. The heating device in this embodiment is a burner 74a.

Preferably, the steam generator of FIG. 6a is designed such that water flowing from the water tank 71 to the chamber 73 is essentially momentarily evaporated. This can be achieved by using a high heating power and a temperature-controlled valve 72b, which opens at a very high selected temperature (i.e. close to 100° C.).

Alternatively, by using a lower selected temperature the chamber 73 is at least partly filled with water during use of the steam generator. In this manner the chamber is operating similar to a small water boiler.

The output line 75 may be provided with a throttling 75a to increase pressure and temperature of the steam.

The second embodiment, illustrated in FIG. 6b, includes a controllable valve 72c, e.g. magnet regulator, which regulates the flow of water from the water tank 71 to the chamber

73. Preferably, the controllable valve 72c is opened to fill the chamber 73 with water, whereafter it is closed.

The heating device 74b consists in this embodiment of an electrical heater 76, which heats up a heating element 78 to a high temperature. The heating element 77 is surrounding the chamber 73, and is preferably held at a very high temperature such that the water flowing from the water tank 71 to the chamber 73 is evaporated, and the vapor is output through the output line 75. Subsequently, the controllable valve 72c is opened to fill the chamber 73 with water again.

In such a manner the chamber 73 is repeatedly filled with water, and the heating device 74b is repeatedly generating steam, which is output through the output line 75.

The third embodiment, illustrated in FIG. 6c, includes a nonreturn valve 72a to prevent water or steam from passing from the chamber 73 to the water tank 71, and a pressure-controlled valve 72d connected in the output line 75, which pressure-controlled valve 72d opens at a selected pressure within the chamber 73. The heating device is any kind of suitable heater, particularly an electrical heater 74c.

Preferably, the pressure-controlled valve 72d is designed to open when a selected overpressure in the chamber 73 is reached, and to remain open until the pressure has dropped to about atmospheric pressure. In such a manner a very powerful puff or blow of vapor may be obtained, which effectively cleans, disinfects and/or sterilizes a teat cup, a teat-cleaning cup, or a robot arm.

Further, the water tank 71 of the FIG. 6c embodiment is provided with a level indicator 78 and is connected to a water supply unit 79. The water supply unit 79 is adapted to supply water to the water tank 71 to keep the amount of water in the water tank 71 essentially unchanged. By such measures a constant pressure is obtained at the upstream side of the nonreturn valve 72a. This guarantees a constant flow velocity of water from the water tank 71 to the chamber 73 when the nonreturn valve 72a is open. If a pump (not illustrated) is used to transport the water from the water tank 71 to the chamber 73, no constant water level in the water tank 71 is needed.

Preferably, the heaters 74a and 74c of the FIGS. 6a and 6c embodiments are adapted to heat only when needed, whereas the heater 74b of the FIG. 6b embodiment is preferably adapted to constantly hold the heating element 77 at an elevated temperature. Obviously, energy and costs are saved if the heater is not using more energy than absolutely needed.

It shall be appreciated that features from the FIGS. 6a-c embodiments may be combined to obtain still further embodiments of the arrangement according to the present invention. Such combinations are easily contemplated by the man skilled in the art departing from the description above.

It shall further be appreciated that the arrangements and methods of the present invention are applicable to other parts of the animal arrangement and the automated milking station.

For instance, the arrangements and methods may easily be adapted for cleaning, disinfection and/or sterilization of any portion of any of the resting, the milking, or the feeding stations 9, 33a, 33b located in the area 1, in which milking animals are allowed to move, see FIG. 1. Examples of such portions are teat receiving openings of teat cups, teat receiving openings of teat cleaning cups, teat cleaning brushes, front portions of robot arms, surfaces of mangers of feeding stations, and floors of resting stations.

Advantageously, the arrangements and methods of the present invention may be adapted for cleaning, disinfection and/or sterilization of each surface of each milking, feeding, and resting station located in the area 1, which an animal visiting the station may contact for a specified purpose or accidentally to ensure that no infections are transmitted from animal to animal.

It shall further be appreciated that the three inventive steam generator arrangements of FIGS. 6a-c may be modified (e.g. using less heat or larger water flows) such that not steam is output through the output line 75, but hot water, preferably water having a temperature close to the boiling temperature, or at least a temperature sufficient to cause the cleaning, disinfecting, or sterilization effect that is desired. The arrangement for cleaning, disinfecting, or sterilization according to the present invention has low power consumption; only small portions of water are heated at a time, and the time, at which the water portions are heated, can be adapted to the use of the arrangement. Thus, large amounts of water stored in the water tank 71 do not have to be kept at an elevated temperature.

Further, the inventive arrangement has an uncomplicated design with very few movable parts. This reduces price and increases reliability.

The arrangement provides also for a very accurate and precise supply of steam or hot water, which in turn provides for a very accurate and precise cleaning, disinfecting, or sterilization of surfaces or parts of the dairy farm.

The invention claimed is:

1. An arrangement for cleaning in an automated milking system comprising a plurality of teat cups, each of which is connected to a respective milk line, wherein, during milking of a milking animal, the plurality of teat cups are attached to the teats of the animal, and vacuum is supplied to the respective milk lines in order to draw milk from the teats of the milking animal, wherein—a cleaning member connected to a supply of cleaning fluid by means of a first supply line for flushing each of said plurality of teat cups with a cleaning fluid in order to remove milk or other residues present at each of said plurality of teat cups;—means for evacuating cleaning fluid from each of said plurality of teat cups or from the first supply line; and—a steam generator for exposing at least one of said plurality of teat cups to steam in order to disinfect said at least one of said plurality of teat cups, wherein said steam generator comprises: a water tank for storing an amount of water; means for regulating a flow of water from said water tank; a chamber for receiving said flow of water, said chamber being capable of housing only a fraction of said amount of water; heating means for generating steam from water housed in said chamber; and an output line for outputting said generated steam.

2. The arrangement of claim 1 wherein the means for evacuating is adapted to evacuate cleaning fluid prior to exposing at least one of said plurality of teat cups to steam.

3. The arrangement of claim 1 wherein the means for evacuating is adapted to evacuate cleaning fluid subsequent to exposing at least one of said plurality of teat cups to steam.

4. The arrangement of claim 1 comprising a source of radiation, particularly UV light radiation, for exposing said at least one of said plurality of teat cups to radiation.

5. The arrangement of claim 1 comprising a second supply line separate from said first supply line, said second supply line connecting said steam generator and said cleaning member.

6. The arrangement of claim 5 wherein the first supply line is provided with a plurality of smaller orifices in radial or tangential directions, through which the cleaning fluid is ejectable as a plurality of jets for flushing each of said plurality of teat cups, while the second supply line is provided with a larger orifice, through which the steam exits to quickly heat said at least one of said plurality of teat cups.

7. The arrangement of claim 5 wherein said automated milking system comprises a washing system for washing surfaces of the automated milking system exposed to milk, including the plurality of teat cups and the milk lines connected thereto, at a regular basis, where said second supply line is connected to a tank of the washing system and is provided with a shut off valve for disconnecting said tank from the plurality of teat cups prior to exposing said at least one of said plurality of teat cups to steam.

8. The arrangement of claim 5 comprising a vacuum source for supplying vacuum to said second supply line prior and/or subsequent to exposing said at least one of said plurality of teat cups to steam.

9. The arrangement of claim 1 further comprising a source of cooling fluid for supplying cooling fluid to said at least one of said plurality of teat cups subsequent to exposing said at least one of said plurality of teat cups to steam.

10. The arrangement of claim 9 wherein said cooling fluid is water, preferably tempered water, or a gas, and wherein the supply of cooling fluid to said at least one of said plurality of teat cups lowers the temperature of said at least one of said plurality of teat cups to a temperature of 25-45° C., more preferably 30-40° C., and most preferably about 35° C.

11. The arrangement of claim 1 wherein said automated milking system comprises a teat-cleaning device for cleaning each of the teats of the milking animal prior to the respective teat being attached to a respective one of the plurality of teat cups for milking, and said arrangement is further adapted to expose said teat-cleaning device to steam in order to disinfect said teat-cleaning device.

12. The arrangement of claim 11 wherein said teat cleaning device comprises brushes for brushing each of the teats of the milking animal.

13. The arrangement of claim 11 wherein said teat cleaning device comprises a teat cleaning cup, to which each of the teats of the milking animal is attached in sequential order to be cleaned, and wherein said teat cleaning cup is disinfected subsequent to the cleaning of at least one of the teats of the milking animal.

14. The arrangement of claim 1 wherein said automated milking system comprises a robot arm provided with a gripper (iSa) and an optical sensing means, wherein, prior to milking the milking animal, the plurality of teat cups are gripped by said robot arm gripper, and moved and attached to the teats of the animal with aid of said optical sensing means, said arrangement further comprising means for disinfecting at least a portion of said robot arm provided with said gripper and said optical sensing means.

15. The arrangement of claim 1 wherein said water tank and said chamber are mutually located to cause said flow of water by means of gravity.

16. The arrangement of claim 1 comprising a pump to cause said flow of water.

17. The arrangement of claim 1 wherein said means for regulating said flow of water includes a valve.

18. The arrangement of claim 1 wherein said means for regulating said flow of water includes a nonreturn valve connected to prevent water or steam from passing from said chamber to said water tank.

19. The arrangement of claim 1 wherein said means for regulating said flow of water includes a temperature-controlled valve connected to prevent water from flowing from said water tank to said chamber if a temperature of said chamber is below a selected temperature and to allow water to flow from said water tank to said chamber if said temperature is above said selected temperature.

20. The arrangement of claim 1 wherein said steam generator is designed such that water flowing from said water tank to said chamber is essentially momentarily evaporated.

21. The arrangement of claim 1 wherein said steam generator is designed such said chamber is at least partly filled with water during use of said steam generator.

22. The arrangement of claim 1 wherein—said means for regulating said flow of water includes a controllable valve controlled to regulate said flow of water to repeatedly fill said chamber with water; —and said heating means and said output line are adapted to repeatedly generate and output steam from water housed in said chamber.

23. The arrangement of claim 1 wherein said heating means includes a heating element held at high temperature during use.

24. The arrangement of claim 1 wherein said heating means includes an electrical heater.

25. The arrangement of claim 1 wherein said output line for outputting said generated steam is provided with a pressure-controlled valve, which opens at a selected pressure.

26. The arrangement of claim 1 wherein said water tank is provided with a level indicator and is connected to a water supply unit, which water supply unit is adapted, with aid of said level indicator, to supply water to said water tank to keep said amount of water in said water tank essentially unchanged.

27. An arrangement for cleaning in an automated milking system comprising a plurality of teat cups, each of which is connected to a respective milk line, wherein, during milking of a milking animal, the plurality of teat cups are attached to the teats of the animal, and vacuum is supplied to the respective milk lines in order to draw milk from the teats of the milking animal, wherein—a cleaning member connected to a supply of cleaning fluid by means of a first supply line for flushing each of said plurality of teat cups with a cleaning fluid in order to remove milk or other residues present at each of said plurality of teat cups;—means for evacuating cleaning fluid from each of said plurality of teat cups or from the first supply line;—a steam generator for exposing at least one of said plurality of teat cups to steam in order to disinfect said at least one of said plurality of teat cups; and—a source of radiation, particularly UV light radiation, for exposing said at least one of said plurality of teat cups to radiation.

28. An arrangement for cleaning in an automated milking system comprising a plurality of teat cups, each of which is connected to a respective milk line, wherein, during milking of a milking animal, the plurality of teat cups are attached to the teats of the animal, and vacuum is supplied to the respective milk lines in order to draw milk from the teats of the milking animal, wherein—a cleaning member connected to a supply of cleaning fluid by means of a first supply line for flushing each of said plurality of teat cups with a cleaning fluid in order to remove milk or other residues present at each of said plurality of teat cups;—means for evacuating cleaning fluid from each of said plurality of teat cups or from the first supply line;—a steam generator for exposing at least one of said plurality of teat cups to steam in order to disinfect said at least one of said plurality of teat cups; and—a second supply line separate from said first supply line, said second supply line connecting said steam generator and said cleaning member.

29. An arrangement for cleaning in an automated milking system comprising a plurality of teat cups, each of which is connected to a respective milk line, wherein, during milking of a milking animal, the plurality of teat cups are attached to the teats of the animal, and vacuum is supplied to the respective milk lines in order to draw milk from the teats of the milking animal, wherein—a cleaning member connected to a supply of cleaning fluid by means of a first supply line for flushing each of said plurality of teat cups with a cleaning fluid in order to remove milk or other residues present at each of said plurality of teat cups;—means for evacuating cleaning fluid from each of said plurality of teat cups or from the first supply line;—a steam generator for exposing at least one of said plurality of teat cups to steam in order to disinfect said at least one of said plurality of teat cups; and—a source of cooling fluid for supplying cooling fluid to said at least one of said plurality of teat cups subsequent to exposing said at least one of said plurality of teat cups to steam.

30. An arrangement for cleaning in an automated milking system comprising a plurality of teat cups, each of which is connected to a respective milk line, wherein, during milking of a milking animal, the plurality of teat cups are attached to the teats of the animal, and vacuum is supplied to the respective milk lines in order to draw milk from the teats of the milking animal, wherein—a cleaning member connected to a supply of cleaning fluid by means of a first supply line for flushing each of said plurality of teat cups with a cleaning fluid in order to remove milk or other residues present at each of said plurality of teat cups;—means for evacuating cleaning fluid from each of said plurality of teat cups or from the first supply line; and—a steam generator for exposing at least one of said plurality of teat cups to steam in order to disinfect said at least one of said plurality of teat cups, wherein said automated milking system comprises a robot arm provided with a gripper (iSa) and an optical sensing means, wherein, prior to milking the milking animal, the plurality of teat cups are gripped by said robot arm gripper, and moved and attached to the teats of the animal with aid of said optical sensing means, said arrangement further comprising means for disinfecting at least a portion of said robot arm provided with said gripper and said optical sensing means.

* * * * *